US009998384B2

United States Patent
Barsness et al.

(10) Patent No.: US 9,998,384 B2
(45) Date of Patent: Jun. 12, 2018

(54) WINDOW MANAGEMENT BASED ON AN INDICATION OF CONGESTION IN A STREAM COMPUTING ENVIRONMENT

(71) Applicant: International Business Machines Corporation, Armonk, NY (US)

(72) Inventors: Eric L. Barsness, Pine Island, MN (US); Daniel E. Beuch, Rochester, MN (US); Alexander Cook, Chaska, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/844,973

(22) Filed: Dec. 18, 2017

(65) Prior Publication Data

US 2018/0091433 A1    Mar. 29, 2018

Related U.S. Application Data

(63) Continuation of application No. 15/263,330, filed on Sep. 12, 2016.

(51) Int. Cl.
*H04L 12/807* (2013.01)
*H04L 29/06* (2006.01)
*H04L 12/803* (2013.01)

(52) U.S. Cl.
CPC .......... *H04L 47/27* (2013.01); *H04L 65/4069* (2013.01); *H04L 47/122* (2013.01)

(58) Field of Classification Search
CPC ......... H04L 47/10; H04L 47/11; H04L 47/27; H04L 47/28; H04L 47/12; H04L 47/122; H04L 47/125; H04L 47/29; H04L 65/4069; H04L 47/283; G06F 17/30958
See application file for complete search history.

(56) References Cited

U.S. PATENT DOCUMENTS

| | | | |
|---|---|---|---|
| 2010/0058147 A1* | 3/2010 | Seferoglu | H04L 1/0009 714/776 |
| 2010/0223606 A1* | 9/2010 | Park | G06F 9/44521 717/166 |
| 2015/0081707 A1 | 3/2015 | Branson et al. | |
| 2015/0236966 A1* | 8/2015 | Francini | H04L 47/27 370/235 |

(Continued)

OTHER PUBLICATIONS

Das et al., "Adaptive Stream Processing using Dynamic Batch Sizing", Electrical Engineering and Computer Sciences University of California at Berkeley, Technical Report No. UCB/EECS-2014-133, Jun. 3, 2014, 32 pages. http://www.eecs.berkeley.edu/Pubs/TechRpts/2014/EECS-2014-133.html.

(Continued)

*Primary Examiner* — Khoa Huynh
(74) *Attorney, Agent, or Firm* — Stosch Sabo

(57) ABSTRACT

Disclosed aspects relate to window management in a stream computing environment. An indication of congestion may be detected with respect to the stream computing environment. Based on the indication of congestion, a set of window configurations in the stream computing environment may be determined. In response to determining the set of window configurations in the stream computing environment, the set of window configurations may be established in the stream computing environment.

1 Claim, 8 Drawing Sheets

(56) References Cited

U.S. PATENT DOCUMENTS

2017/0026467 A1  1/2017  Barsness et al.

OTHER PUBLICATIONS

"Operators: spl 1.2.1", IBM InfoSphere Streams Version 4.1.1, 3 pages, printed Mar. 6, 2016. https://www.ibm.com/support/knowledgecenter/api/content/nl/en-us/SS.
Plale et al., "Evaluation of Rate-based Adaptivity in Asynchronous Data Stream Joins", Proceedings of the 19th IEEE International Parallel and Distributed Processing Symposium (IPDPS'05), 10 pages, 2005.
Barsness et al., "Window Management Based on an Indication of Congestion in a Stream Computing Environment", U.S. Appl. No. 15/263,330, filed Sep. 12, 2016.
Barsness et al., "Window Management Based on a Set of Computing Resources in a Stream Computing Environment", U.S. Appl. No. 15/263,324, filed Sep. 12, 2016.
Barsness et al., "Window Management Based on a Set of Computing Resources in a Stream Computing Environment", U.S. Appl. No. 15/844,931, filed Dec. 18, 2017.
List of IBM Patents or Patent Applications Treated as Related, dated Dec. 18, 2017, 2 pages.
Accelerated Examination Support Document, dated Dec. 14, 2017, 22 pages.

\* cited by examiner

WINDOW MANAGEMENT BASED ON AN INDICATION OF CONGESTION IN A STREAM COMPUTING ENVIRONMENT

BACKGROUND

This disclosure relates generally to computer systems and, more particularly, relates to window management in a stream computing environment. The amount of stream computing data that needs to be managed by enterprises is increasing. Management of stream computing environments may be desired to be performed as efficiently as possible. As stream computing data needing to be managed increases, the need for efficient window management in a stream computing environment may increase.

SUMMARY

Aspects of the disclosure relate to window management in a stream computing environment. The window sizes of stream operators in a stream computing environment may be dynamically increased or decreased based upon the relative data congestion of a particular stream operator. A streams manager may monitor for congestion within a stream computing operator graph, and determine if a congested segment of the operator graph includes windowed operators that are configured for window adjustment. Based on the nature of the congestion, the window size of one or more operators may be adjusted to reduce congestion. When a plurality of windowed operators are within the congested segment of the operator graph, the window size of each operator may be adjusted independently or in conjunction with other operators. Adjustments to stream operator window sizes may continue until data throughput achieves a threshold throughput level.

Disclosed aspects relate to window management in a stream computing environment. An indication of congestion may be detected with respect to the stream computing environment. Based on the indication of congestion, a set of window configurations in the stream computing environment may be determined. In response to determining the set of window configurations in the stream computing environment, the set of window configurations may be established in the stream computing environment.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
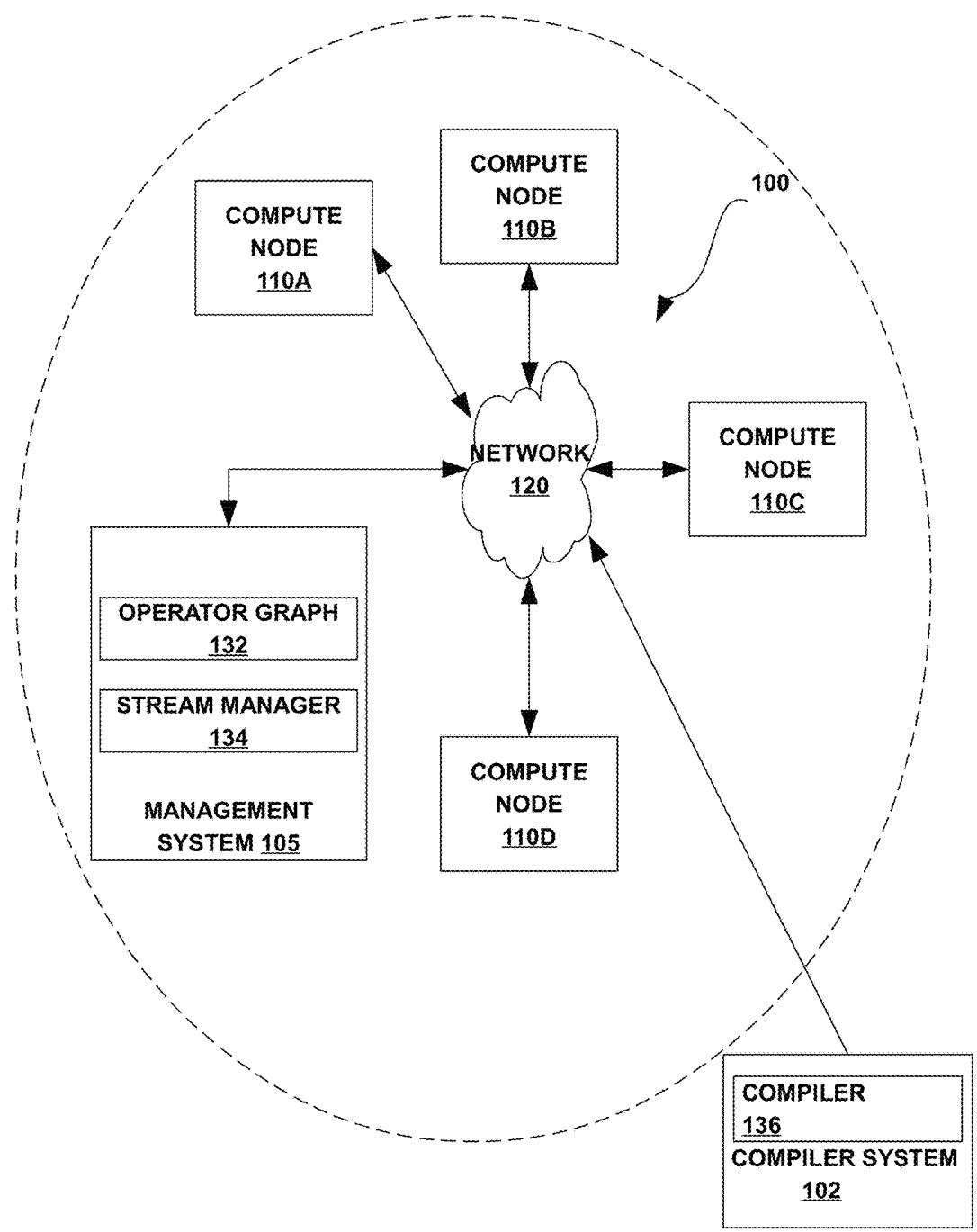
FIG. 1 illustrates an exemplary computing infrastructure to execute a stream computing application according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to window management in a stream computing environment. The window sizes of stream operators in a stream computing environment may be dynamically increased or decreased based upon the relative data congestion of a particular stream operator. A streams manager may monitor for congestion within a stream computing operator graph, and determine if a congested segment of the operator graph includes windowed operators (e.g., join operators) that are configured for window adjustment. Based on the nature of the congestion, the window size of one or more operators may be adjusted to reduce congestion. When a plurality of windowed operators are within the congested segment of the operator graph, the window size of each operator may be adjusted independently or in conjunction with other operators. Adjustments to stream operator window sizes may continue until data throughput achieves a threshold throughput level. Leveraging dynamic window size adjustment may be associated with benefits such as tuple throughput rate, data processing efficiency, or stream application performance.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them.

Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

A streams processing job has a directed graph of processing elements that send data tuples between the processing elements. The processing element operates on the incoming tuples, and produces output tuples. A processing element has an independent processing unit and runs on a host. The streams platform can be made up of a collection of hosts that are eligible for processing elements to be placed upon. When a job is submitted to the streams run-time, the platform scheduler processes the placement constraints on the processing elements, and then determines (the best) one of these candidates host for (all) the processing elements in that job, and schedules them for execution on the decided host.

Aspects of the disclosure include a method, system and computer program product for window management in a stream computing environment. An indication of congestion with respect to the stream computing environment may be detected. The indication of congestion may include a build-up of tuples. The indication of congestion may include a segment of congestion of an operator graph with respect to the stream computing environment. The indication of congestion may correspond with a throughput factor, and a benchmark threshold value may exceed a throughput value for the throughput factor. Based on the indication of congestion, a set of window configurations in the stream computing environment may be determined. In embodiments, a set of window configuration parameter values may be received, and the set of window configurations may be determined using the set of window configuration parameter values. In response to determining the set of window configurations in the stream computing environment, the set of window configurations may be established in the stream computing environment. In embodiments, establishing the set of window configurations in the stream computing environment may alter a throughput factor.

In embodiments, a streams management engine may monitor for the indication of congestion. The streams management engine may modify the set of window configurations until a throughput value for a throughput factor in the stream computing environment achieves a target threshold value for the throughput factor in the stream computing environment. In embodiments, a first window configuration of a window in the stream computing environment may be modified to a second window configuration. In embodiments, the set of window configurations may include a set of window sizes of a set of windows. Modifying the first window configuration to the second window configuration may include adjusting, in a dynamic fashion, a window size of the window. A reduction of the indication of congestion may be detected. In embodiments, the indication of congestion may indicate a segment of congestion having a window which is within the segment of congestion, and a window size of the window within the segment of congestion may be decreased. In embodiments, the stream computing environment may include a window which is external to the segment of congestion, and the window size of the window which is external to the segment of congestion may be increased. Altogether, aspects of the disclosure can have performance or efficiency benefits (e.g., wear-rate, service-length, reliability, speed, flexibility, load balancing, responsiveness, stability, high availability, resource usage, productivity). Aspects may save resources such as bandwidth, disk, processing, or memory.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
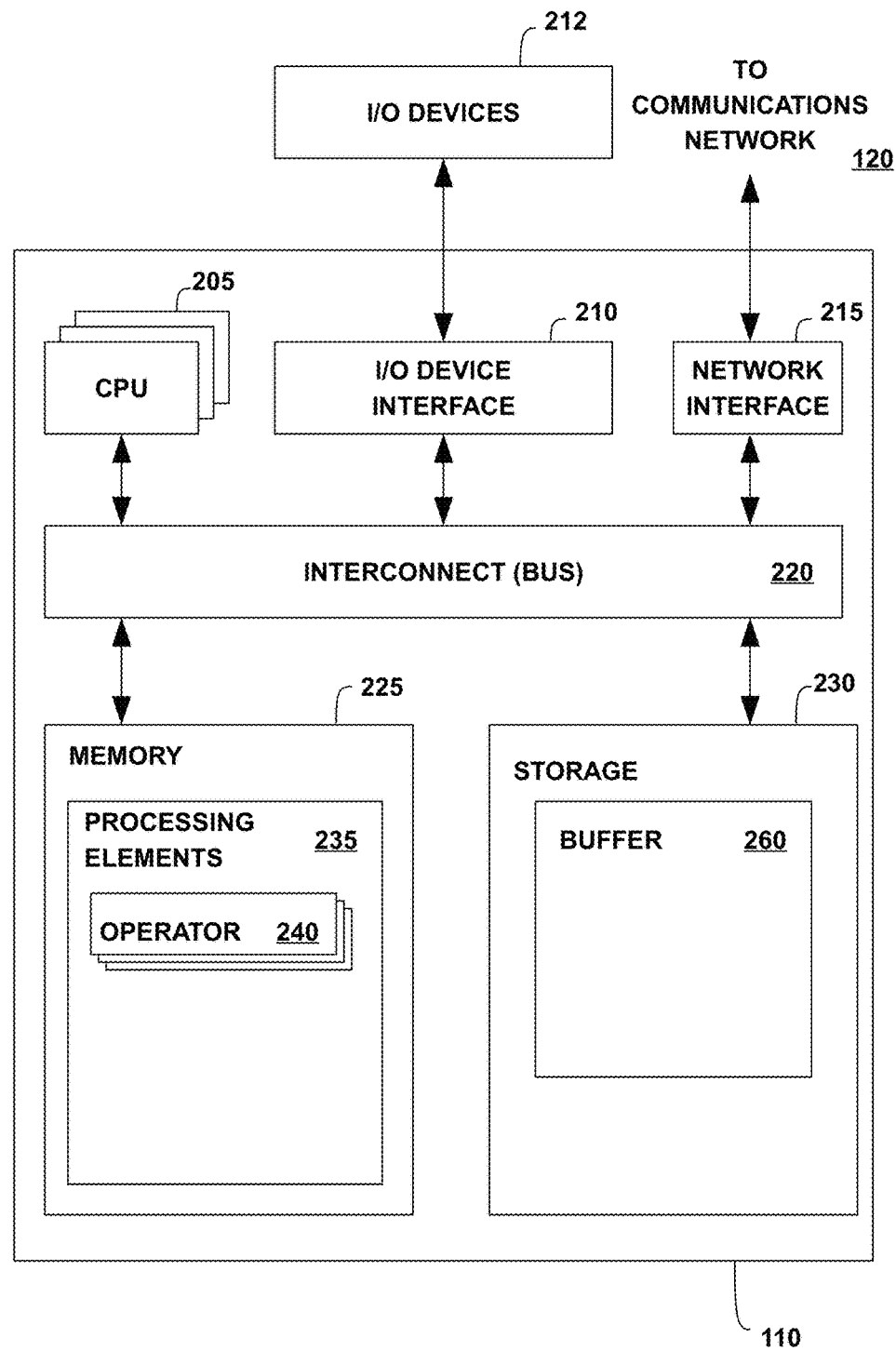
FIG. 2 illustrates a view of a compute node according to embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
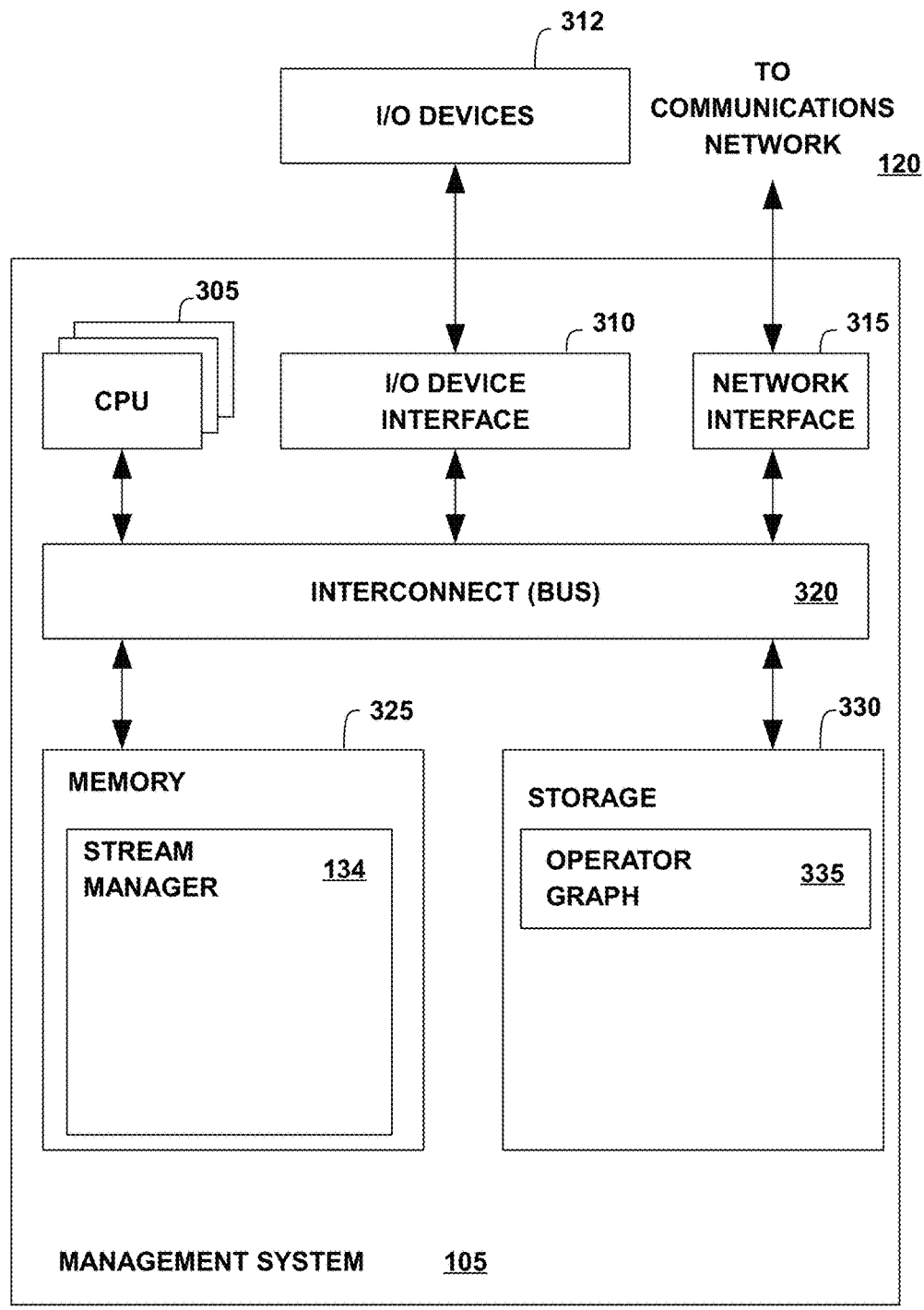
FIG. 3 illustrates a view of a management system according to embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing or stored in memory 325 (e.g., completely in embodiments, partially in embodiments).

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
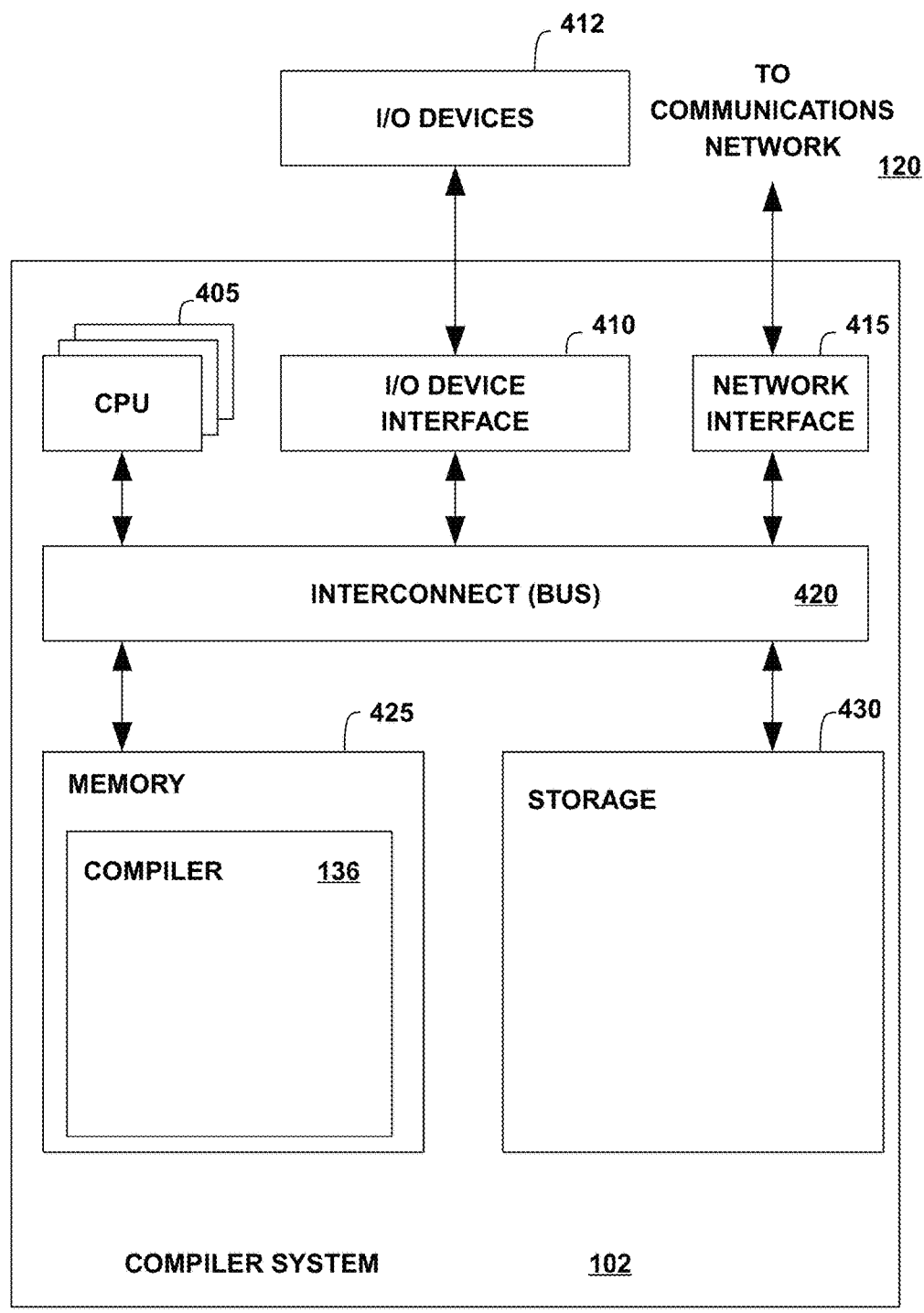
FIG. 4 illustrates a view of a compiler system according to embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
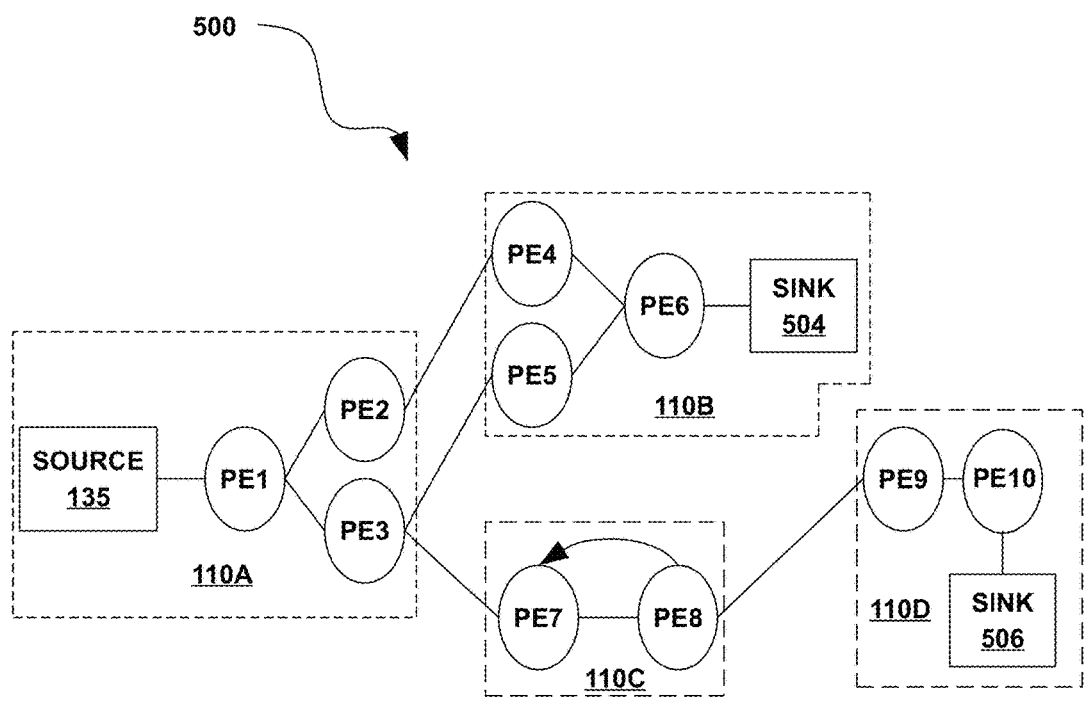
FIG. 5 illustrates an exemplary operator graph for a stream computing application according to embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
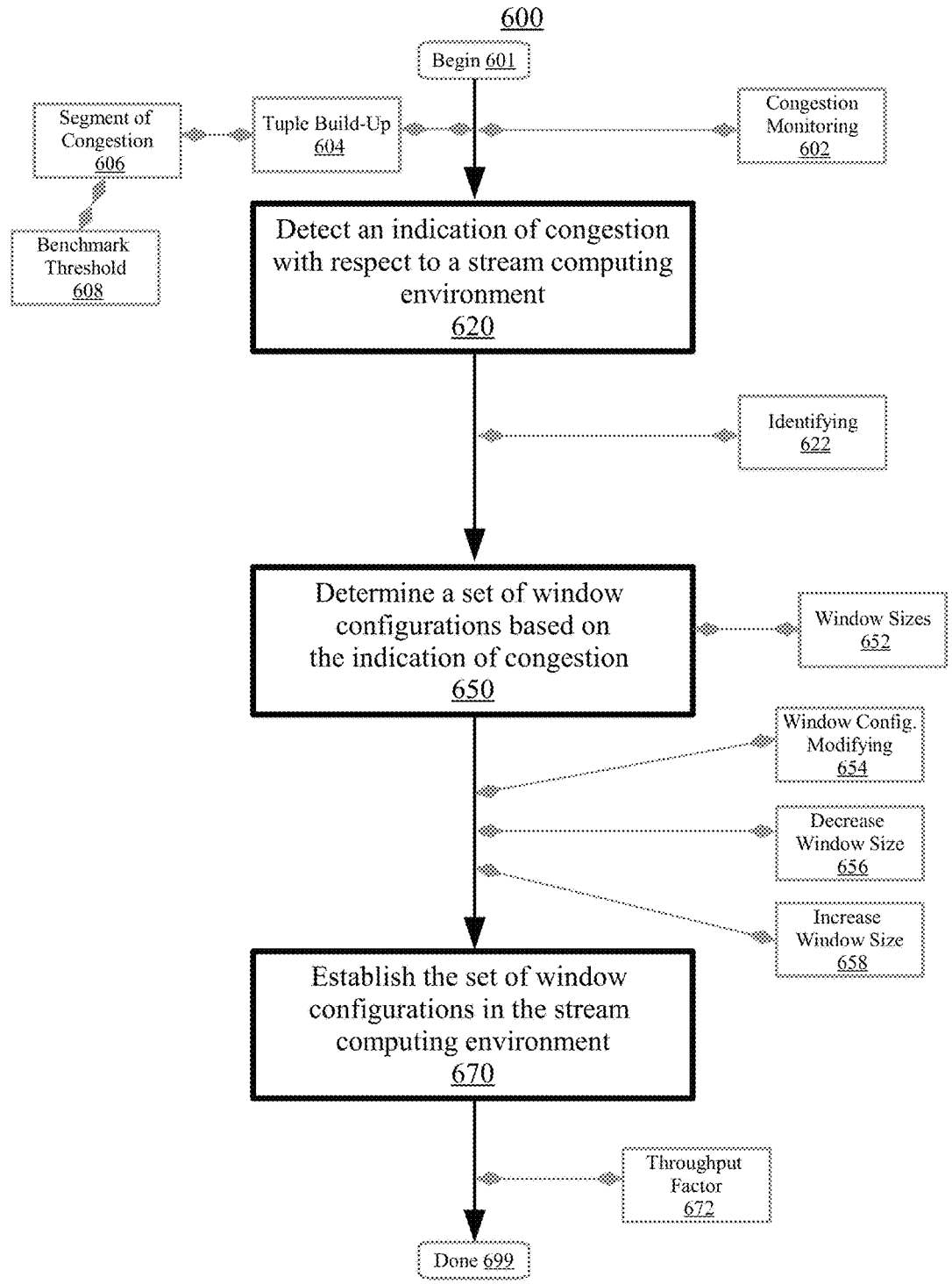
FIG. 6 is a flowchart illustrating a method for window management in a stream computing environment, according to embodiments.

FIG. 6 is a flowchart illustrating a method 600 for window management in a stream computing environment, according to embodiments. The stream computing environment may include one or more stream operators (e.g. processing elements) configured to perform operations (logic-based analysis, attribute modification) on data (e.g., tuples) as part of a stream computing application. In embodiments, one or more stream operators of the stream computing environment may include a window to facilitate data analysis. Generally, the window may include a buffer or queue configured to hold (e.g., maintain) a set of data in order to perform an analysis operation on the set of data. For instance, the window may be configured to hold data (e.g., tuples) over a particular time period (e.g., tuples from the last 1 minute, 10 minutes, 4 hours), a specified number of tuples (e.g., 500 tuples, 1000 tuples), or a designated capacity of data (e.g., 1 gigabyte, 5 gigabytes). Aspects of method 600 relate to dynamically adjusting the size of a window of one or more stream operators in a stream computing environment based on data congestion. Leveraging dynamic window size adjustment may be associated with benefits including tuple throughput rate, data processing efficiency, and stream application performance. The method 600 may begin at block 601.

In embodiments, a streams management application may monitor for an indication of congestion at block 602. The streams management application may include a software widget or other tool configured to facilitate operation of a streaming application in the stream computing environment. Generally, monitoring can include observing, supervising, scanning, overseeing, analyzing, or inspecting for the indication of congestion. The indication of congestion may include a sign, evidence, trace, warning, symptom, or other representation of congestion (e.g., slowdown, bottleneck) with respect to the stream computing environment. In embodiments, monitoring may include using a streams management application to analyze the data throughput of an operator graph to identify the indication of the congestion. For instance, the streams management application may inspect the total tuple throughput of the operator graph as well as the tuple throughput of individual stream operators to determine areas of the operator graph that may be associated with congestion (e.g., tuple throughput rate that is relatively low with respect to other areas). Other methods of monitoring for the indication of congestion are also possible.

In embodiments, the indication of congestion may indicate a build-up of tuples at block 604. Generally, the build-up of tuples may include an accumulation, aggregation, or other profusion of tuples that leads to a slowdown or bottleneck within an operator graph of the stream computing environment. In embodiments, the build-up of tuples may include a group of tuples that have become backed-up in the processing queue (e.g., back-pressure queue) of a particular stream operator. For instance, a particular stream operator may receive more tuples in a given time period than it is able to process, such that tuples waiting to be processed accumulate in a hold queue for the stream operator. In this way, the overall tuple throughput rate of the operator graph may be reduced, resulting in congestion with respect to the stream computing environment. Other types of tuple build-up are also possible. In embodiments, the indication of congestion may indicate a segment of congestion of an operator graph with respect to the stream computing environment at block 606. Generally, the segment of congestion of the operator graph may include an area, portion, or region of the operator graph that is associated with reduced tuple throughput, excessive tuple accumulation, or other type of data traffic slowdown. For example, the segment of congestion of the operator graph may include a group of one or more stream operators associated with a data traffic bottleneck. Other types of the indication of congestion are also possible.

In embodiments, the indication of congestion may correspond with a throughput factor at block 608. A benchmark threshold value may exceed a throughput value for the throughput factor. Generally, the throughput factor may include one or more characteristics, attributes, or properties of the stream computing environment that influence how data is processed by the stream computing application (e.g., tuple routing methods, input/output protocols). The throughput factor may be associated with a throughput value. In embodiments, the throughput value may be a quantitative measure of the rate at which tuples are processed and passed through an operator graph of the streaming application. As an example, the throughput value may include a number of tuples processed by the operator graph in a given time period (e.g., 200 tuples per second). In embodiments, an operator graph may be associated with a benchmark throughput value that indicates a target throughput rate (e.g., goal, desired throughput). Aspects of the disclosure relate to the recognition that, in embodiments, a throughput value failing to achieve the benchmark throughput value may indicate congestion with respect to the stream computing environment. Consider, for example, a stream computing environment associated with a benchmark throughput value of 500 tuples per second. A throughput value for the stream computing environment may be measured to be 356 tuples per second. As the throughput value of 356 tuples per second does not achieve the benchmark throughput value of 500 tuples per second, the stream computing environment may be considered to be congested. Other types of congestion indications are also possible.

At block 620, an indication of congestion with respect to a stream computing environment may be detected. Generally, detecting can include sensing, discovering, recognizing, identifying, or otherwise ascertaining the indication of congestion. As described herein, the indication of congestion may include a sign, evidence, trace, warning, symptom, or other representation of congestion (e.g., slowdown, bottleneck) with respect to the stream computing environment. In embodiments, detecting may include identifying that one or more stream operators or other regions of an operating graph appear to be or are responsible for a slowdown of the tuple throughput rate of the stream computing environment. As an example, detecting may include using a data traffic diagnostic tool to evaluate the tuple throughput characteristics of one or more stream operators of the stream computing environment, and identifying one or more stream operators that have a tuple throughput rate below a throughput threshold (e.g., throughput rate of 620 tuples per second is below a throughput threshold of 700 tuples per second). In certain embodiments, detecting the indication of congestion may include measuring the number of tuples held in the back-pressure queue of one or more stream operators, and comparing the number of tuples to a tuple back-pressure threshold. In response to ascertaining that the number of tuples in the back-pressure queue for a particular stream operator exceeds the back-pressure threshold for that stream operator (e.g., 50 tuples may exceed a back-pressure threshold of 30 tuples), the indication of congestion may be detected. Other methods of detecting the indication of congestion are also possible.

In embodiments, it may be identified that the indication of congestion corresponds with a set of stream operators having a set of windows at block 622. Generally, identifying can include recognizing, ascertaining, or determining that the indication of congestion corresponds with the set of stream operators having the set of windows. Aspects of the disclosure relate to the recognition that, in certain situations, as the amount of data maintained by the window of a stream operator (e.g., join operator) increases, the throughput rate of the stream computing environment may decrease. Accordingly, in certain embodiments, the set of windows of the set of stream operators may be one cause of the congestion within the stream computing environment. In embodiments, identifying that the indication of congestion corresponds with the set of operators having the set of windows may include assessing the set of windows for the set of stream operators and ascertaining that the amount of data maintained by one or more windows of the set of windows exceeds a window data threshold. As an example, for a stream computing environment having a window data threshold of 4 gigabytes of data, a window determined to have 6 gigabytes of data may be identified as a potential indication of congestion for the stream computing environment. Other methods of identifying that the indication of congestion corresponds with the set of stream operators having the set of windows are also possible.

At block 650, a set of window configurations in the stream computing environment may be determined. The set of window configurations may be determined based on the indication of congestion. Generally, determining can include selecting, calculating, devising, formulating, or ascertaining the set of window configurations. The set of window configurations may include one or more properties or attributes that define the operational characteristics of the set of windows within the stream computing environment. For instance, the set of window configurations may include attributes that specify the type and amount of data managed by a particular stream operator, as well as the type of operations that a stream operator performs on the data (e.g., join operation). In embodiments, determining the set of window configurations may include evaluating the throughput performance of an operator graph, and ascertaining a set of window configurations that are expected to be associated with positive impacts (e.g., increased throughput rate, operator performance) with respect to the stream computing environment. In certain embodiments, determining the set of window configurations may be based on historical usage data for the stream computing environment or similar stream computing environments. As described herein, in certain embodiments the set of window configurations may be determined based on the indication of congestion. For instance, determining the set of window configurations may include selecting a combination of parameters for one or more stream operator windows that reduce or benefit congestion within the operator graph (e.g., decrease/eliminate tuple build-up, increase throughput). Other methods of determining the set of window configurations are also possible.

In embodiments, the set of window configurations may include a set of window sizes of a set of windows at block 652. Generally, the set of windows sizes of the set of windows may include one or more parameters that designate the amount of data that may be maintained by a particular window of a streaming operator. In embodiments, the window size may specify a time-frame for which tuples may be held in the window (e.g., hold the last/most recent 10 minutes of tuples, last 30 minutes of tuples, last 2 hours of tuples). In embodiments, the window size may specify a number of tuples to be held by a window (e.g., most recent 100 tuples, most recent 500 tuples, most recent 1500 tuples). In embodiments, the window size may designate an amount of data to be maintained by a window (e.g., 4 gigabytes of tuples, 7 gigabytes of tuples). Other types of window sizes of the set of windows are also possible.

Consider the following example. An indication of congestion for a stream computing environment may be detected that indicates that a first stream operator is associated with a tuple build-up. For instance, the first stream operator may have a window size of "Most recent 3 hours of tuples," such that a large number of tuples (e.g., exceeding a threshold number) have accumulated in a back-pressure queue of the first stream operator, and the throughput rate of the stream operator has decreased (e.g., below a threshold level). Accordingly, aspects of the disclosure relate to determining a window configuration (e.g., window size) for the first stream operator that will have positive impacts with respect to the throughput rate of the stream computing environment. In embodiments, determining the window configuration for the first stream operator may include analyzing historical usage data and performance metrics for the stream computing environment to ascertain an appropriate window configuration for the first stream operator. In response to analyzing the historical usage data, it may be determined that a past window configuration for the first stream operator having a window size of "Most recent 2 hours of tuples" or "2 hours" was not associated with congestion. Accordingly, a window size of "Most recent 2 hours of tuples" or "2 hours" may be ascertained for the first stream operator.

In embodiments, the set of window configurations may be modified at block 654. The set of window configurations may be modified by a streams management engine until a throughput value for a throughput factor in the stream computing environment achieves a target threshold value for the throughput factor in the stream computing environment. Generally, modifying can include altering, adjusting, increasing, decreasing, or otherwise changing the set of window configurations. As described herein, aspects of the disclosure relate to altering the window configuration (e.g., window size) of a set of stream operators to positively impact the throughput rate of the stream computing environment. For instance, the streams management engine may be configured to successively (e.g., gradually) adjust the window configuration of a stream operator until a throughput value achieves a target threshold value. In certain embodiments, the streams management engine may be configured to analyze the relationship between the throughput rate of the stream computing environment and the window configuration of one or more stream operators, and calculate a window size for the set of stream operators that will result in a throughput rate that will achieve the target threshold value. Other methods of modifying the set of window configurations are also possible.

In embodiments, a window size of a window within a segment of congestion may be decreased at block 656. Generally, decreasing can include diminishing, lessening, shrinking, or otherwise reducing the window size of the window within the segment of congestion. As described herein, aspects of the disclosure relate to the recognition that reduction of the window size of a stream operator located in a segment of congestion of an operator graph may be associated with positive impacts with respect to tuple throughput rate. Accordingly, in embodiments, the window size of a window within a segment of congestion may be reduced. As examples, a window size of "8 gigabytes" may be reduced to "7 gigabytes," a window size of "Most recent 1 hour of tuples" may be reduced to "Most recent 50 minutes of tuples," or a window size of "600 tuples" may be reduced to "500 tuples." Other methods of decreasing the window size of a window, as well as window size reductions of greater or lesser extents are also possible.

As an example, consider that a particular stream computing environment has a current throughput rate of 600 tuples per second, and a target threshold value of 900 tuples per second. In embodiments, the stream computing environment may detect an indication of congestion associated with a stream operator having a window size of 10 gigabytes. Accordingly, the streams management engine may be configured to modify the window configuration by reducing the window size of the stream operator. The streams management engine may first reduce the window size from 10 gigabytes to 8 gigabytes, and subsequently measure the tuple rate of the stream computing environment to be 800 tuples per second. As the throughput value of 800 tuples per second does not yet achieve the target threshold value of 1000 tuples per second, the streams management engine may continue to modify the window configuration by further reducing the window size of the stream operator to 6 gigabytes. In response to reducing the window size to 6 gigabytes, it may be determined that the throughput rate has increased to 1000 tuples per second, which achieves the target threshold value of 900 tuples per second. Other methods of modifying the set of window configurations until the target threshold value is achieved are also possible.

In embodiments, a window size of a window which is external to the segment of congestion may be increased at block 658. Generally, increasing can include raising, expanding, boosting, growing, or enlarging the window size of the window which is external to the segment of congestion. Aspects of the disclosure relate to the recognition that in certain situations, window sizes of windows corresponding to streaming operators that are external to the segment of congestion may be increased without adversely affecting the throughput rate of the stream computing environment. Accordingly, in embodiments, aspects of the disclosure relate to raising the window size of one or more windows of the stream computing environment (e.g., to facilitate the performance of analysis operations on a set of data stored in the window). As examples, a window size of "4 gigabytes" may be increased to "6 gigabytes," a window size of "Most recent 30 minutes of tuples" may be increased to "Most recent 60 minutes of tuples," or a window size of "500 tuples" may be increased to "700 tuples." Other methods of increasing the window size of a window, as well as window size increases of greater or lesser extents are also possible.

At block 670, the set of window configurations may be established in the stream computing environment. Establishing the set of window configurations may be performed in response to determining the set of window configurations. Generally, establishing can include creating, applying, configuring, generating, instantiating, or implementing the set of window configurations. In embodiments, establishing may include dynamically (e.g., in real-time, on-the-fly) adjusting one or more parameters of a set of stream operators to define the new set of window configurations. As described herein, establishing may include modifying window parameters for a set of windows of the stream operators to adjust (e.g., increase or decrease) the window size of one or more windows. As an example, a window size of a particular stream operator may be reduced from "Last 30 minutes of tuples" to "Last 10 minutes of tuples" in order to decrease the accumulation of tuples in the back-pressure queue of the stream operator and positively impact the throughput rate of the stream computing environment. In embodiments, establishing the set of window configurations may include using the streams management engine to simultaneously modify the window sizes of a plurality of stream operators during operation of a streaming application. Other methods of establishing the set of window configurations in the stream computing environment are also possible.

In embodiments, establishing the set of window configurations in the stream computing environment may alter a throughput factor at block 672. As described herein, aspects of the disclosure relate to the recognition that, as the amount of data/tuples held in the back-pressure queue of a stream operator window decrease, the memory footprint of the stream operator may decrease, leading to an increased overall throughput rate for the stream computing environment. Accordingly, establishing the set of window configurations in the stream computing environment and modifying one or more parameters (e.g., window sizes) of the set of windows may cause an increase or decrease in the throughput rate. For example, in embodiments, reducing the window size of a stream operator (e.g., from 4 gigabytes of tuples to 2 gigabytes of tuples) may decrease the memory footprint of the stream operator, and result in an increase of the tuple throughput rate of the stream computing environment (e.g., 600 tuples per second to 750 tuples per second). Other types of changes to the throughput factor are also possible.

Consider the following example. A streams management engine may monitor a stream computing environment and detect an indication of congestion associated with a first stream operator. For instance, the first stream operator may have a window size of "Most recent 4 hours of tuples," such that a large number of tuples have accumulated in the back-pressure queue for the stream operator, leading to an increased memory footprint for the streaming application and a decrease in the total throughput rate of the stream computing environment. Accordingly, as described herein, the streams management engine may be configured to gradually decrease the window size of a stream operator while monitoring the throughput rate until a threshold throughput rate is achieved. For instance, in embodiments, the streams management engine may be configured to decrease the window size of the first stream operator by 10 minute increments until the threshold rate achieves the target threshold value (e.g., 700 tuples per second). Other methods of managing the window size of a stream operator to increase the throughput rate are also possible.

Method 600 concludes at block 699. Aspects of method 600 may provide performance or efficiency benefits for window management in a stream computing environment. For example, aspects of method 600 may have positive impacts with respect to increasing the tuple throughput rate of a streaming application by adjusting the window size of one or more stream operators. The detecting, the determining, the establishing, and other steps described herein may each occur in an automated fashion without user invention (e.g., using automated computing machinery, fully machine-driven without manual stimuli). Altogether, dynamic window size adjustment may be associated with benefits including tuple throughput rate, data processing efficiency, and stream application performance.

Figure 7:
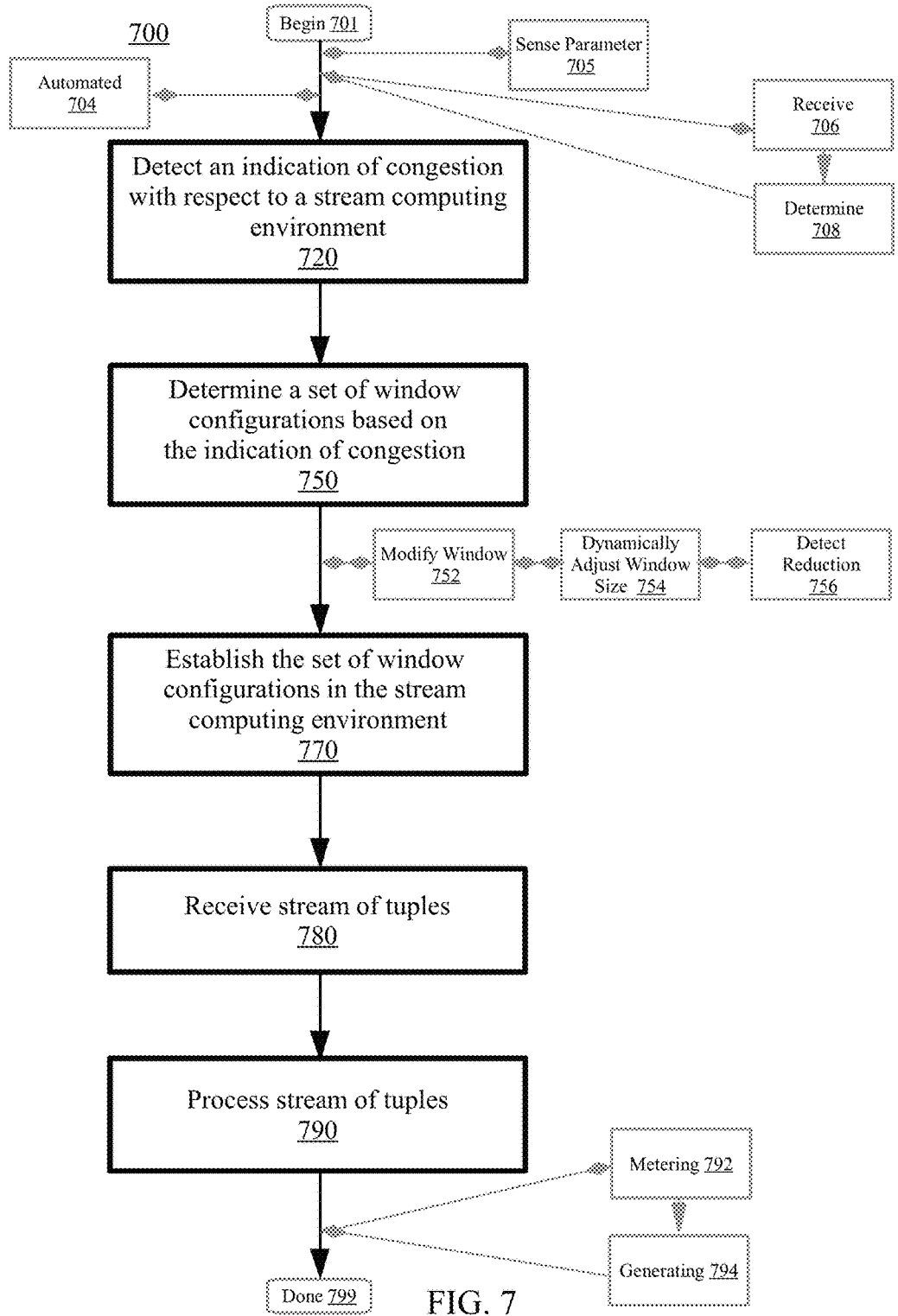
FIG. 7 is a flowchart illustrating a method for window management in a stream computing environment, according to embodiments.

FIG. 7 is a flowchart illustrating a method 700 for window management in a stream computing environment, according to embodiments. Aspects of method 700 relate to dynamically adjusting the size of a window of one or more stream operators in a stream computing environment based on data congestion. Aspects of method 700 may substantially correspond to embodiments described herein and the FIGS. 1-8. The method 700 may begin at block 701. At block 720, an indication of congestion with respect to a stream computing environment may be detected. At block 750, a set of window configurations based on the indication of congestion may be determined. At block 770, the set of window configurations may be established in the stream computing environment. Leveraging dynamic window size adjustment may be associated with benefits including tuple throughput rate, data processing efficiency, and stream application performance.

In embodiments, the detecting, the determining, the establishing, and other steps described herein may each occur in an automated fashion without user intervention at block 704. In embodiments, the detecting, the determining, the establishing, other steps described herein may be carried out by an internal streams management module maintained in a persistent storage device of a computing node that hosts the streaming application. In certain embodiments, the detecting, the determining, the establishing, and other steps described herein may be carried out by an external streams management module hosted by a remote computing device or server (e.g., accessible via a subscription, usage-based, or other service model). In this way, aspects of window management in a stream computing environment may be performed using automated computing machinery without manual action. Other methods of performing the steps described herein are also possible.

In embodiments, a parameter value which indicates a window size is adjustable may be sensed at block 705. Generally, sensing can include discovering, recognizing, ascertaining, or otherwise identifying the parameter value. Aspects of the disclosure relate to the recognition that in some situations, stream computing environments may have predetermined window configurations with fixed window sizes. Accordingly, aspects of the disclosure relate to ascertaining that a stream computing environment is configured for adjustable window sizes based on a parameter value. The parameter value may include a figure, symbol, character, number, or other indication that a particular window size is configured to be adjusted, modified, or otherwise changed. In embodiments, the parameter value may be a specification programmed into a streaming application by a developer of the streaming application. For example, the parameter value may include a binary value such that a first value (e.g., 0) indicates that the window size is non-adjustable, and a second value (e.g., 1) indicates that the window size is adjustable. In embodiments, sensing the parameter value may include using the streams management engine to access a database, index, directory, or other location where the parameter value is stored, and ascertaining the parameter value. Other methods of sensing the parameter value are also possible.

In embodiments, a set of window configuration parameter values may be received at block 706. Generally, receiving can include collecting, gathering, obtaining, detecting, or otherwise accepting delivery of the set of window configuration parameter values. The set of window configuration parameter values may include magnitudes, quantities, numbers, figures, or symbols that specify one or more characteristics of the window configuration of a stream operator. For instance, the set of window configuration parameter values may designate a window size for one or more windows of the stream computing environment. In certain embodiments, the set of window configuration parameter values may indicate both desired or target (e.g., ideal) window sizes as well as upper and lower window size limits (e.g., maximum or ceiling window size, minimum or floor window size). In embodiments, the set of window configuration parameter values may be received from a user or stream computing environment administrator. In embodiments, the set of window configurations may be determined using the set of window configuration parameter values at block 708. For instance, the set of window configuration parameter values may be imported by the stream computing environment and directly applied (e.g., established) as the window configurations for a set of windows. In embodiments, the streams management engine may use the set of window configuration parameter values along with other operational constraints and target thresholds (e.g., target throughput thresholds) of the stream computing environment to determine the set of window configurations. As an example, a user may specify a target window size of "5 gigabytes," as well as an upper window size limit of "7 gigabytes" and a lower window size limit of "3 gigabytes" for a particular window. As such, the streams management engine may attempt to make the window size 5 gigabytes, but determine that a window size of 5 gigabytes prevents the throughput rate of the stream computing environment from achieving a target throughput value. Accordingly, the streams management engine may lower the window size from 5 gigabytes to 4 gigabytes, such that the target throughput value is achieved while remaining within the window size range specified by set of window configuration parameter values. Other methods of determining the set of window configurations based on the set of window configuration parameter values are also possible.

In embodiments, a window in the stream computing environment may be modified from a first window configuration to a second window configuration at block 752. Generally, modifying can include altering, adjusting, increasing, decreasing, or otherwise changing the first window configuration to the second window configuration. As described herein, aspects of the disclosure relate to the recognition that in some situations, the window configuration of a window in the stream computing environment may be associated with network traffic slowdown, bottlenecks, or other congestion in the stream computing environment. For example, a particular window may include a substantially large window size that has a relatively large memory footprint, resulting in a decrease to overall tuple throughput. Accordingly, aspects of the disclosure relate to modifying the window configuration from a first window configuration to a second window configuration (e.g., to increase streaming application performance). In embodiments, modifying the window configuration may include altering or adjusting one or more window parameters of one or more streaming operators. Other methods of modifying a window from a first window configuration to a second window configuration are also possible.

In embodiments, modifying a window in the stream computing environment from a first window configuration to a second window configuration may include adjusting a window size of the window at block 754. The window size of the window may be adjusted in dynamic fashion. Generally, adjusting may include increasing, decreasing, reducing, expanding, or otherwise altering the window size of the window. In embodiments, aspects of the disclosure relate to adjusting the window size of one or more windows in real-time/on-the-fly or while the streaming application is running (e.g., in operation). As described herein, adjusting may include expanding or contracting the size of one or more windows of the streaming computing environment. As examples, adjusting the window size may include decreasing the window size (e.g., from 5 gigabytes of data to 4 gigabytes of data) in a congested segment of an operator graph, or increasing the window size (e.g., from 1 hour of tuples to 2 hours of tuples) in a non-congested area of an operator graph. Other methods of adjusting the windows size in dynamic fashion are also possible.

In embodiments, a reduction of the indication of congestion may be detected at block 756. Generally, detecting can include sensing, discovering, recognizing, identifying, or otherwise ascertaining the reduction of the indication of congestion. As described herein, aspects of the disclosure relate to modifying the window size of a window of one or more stream operators to positively impact the throughput rate of the stream computing environment. Accordingly, in certain embodiments, modification of the window size of a stream operator may be associated with a reduction in the indication of congestion. In embodiments, detecting the reduction of the indication of congestion may include using a data traffic diagnostic tool to analyze the throughput performance of the stream computing environment, and sensing an increase in the overall traffic throughput. In certain embodiments, detecting the reduction may include evaluating the back-pressure queue of one or more stream operators and ascertaining that the number of tuples held in the back-pressure queue has decreased (e.g., with respect to a previous congested state). Other methods of detecting the reduction of the indication of congestion are also possible.

At block 780, a stream of tuples is received. The stream of tuples may be processed by a plurality of processing elements (e.g., stream operators) operating on a set of compute nodes (e.g., in a stream application environment). The stream of tuples may be received consistent with the description herein including FIGS. 1-8. Current/future processing by the plurality of processing elements may be performed consistent with the description herein including FIGS. 1-8. The set of compute nodes may include a shared pool of configurable computing resources. For example, the set of compute nodes can be a public cloud environment, a private cloud environment, or a hybrid cloud environment. In certain embodiments, each of the set of compute nodes are physically separate from one another.

In embodiments, the stream of tuples is processed at block 790. The stream of tuples may be processed by the plurality of processing elements operating on the set of compute nodes. The stream of tuples may be processed consistent with the description herein including FIGS. 1-8. In embodiments, stream operators operating on the set of compute nodes may be utilized to process the stream of tuples. Processing of the stream of tuples by the plurality of processing elements may provide various flexibilities for stream operator management. Overall flow (e.g., data flow) may be positively impacted by utilizing the stream operators.

In embodiments, use of window management may be metered at block 792. Metering can include measuring, tracking, documenting, recording, or calculating the degree or extent of the utilization of the window management operations in the stream computing environment. The degree of utilization may be calculated based on the number of times window management operations were utilized (e.g., 10 times, 100 times), the amount of data managed using window management operations (e.g., tuple throughput), application configurations (e.g., streaming application configurations, window parameters), resource usage (e.g., data processed by window management) or other means. Based on the metered use, an invoice may be generated at block 794. The invoice may include a bill, fee, service charge, or other itemized breakdown specifying compensation for the usage of window management. Subscription based models are also possible. The method 700 may conclude at block 799.

Figure 8:
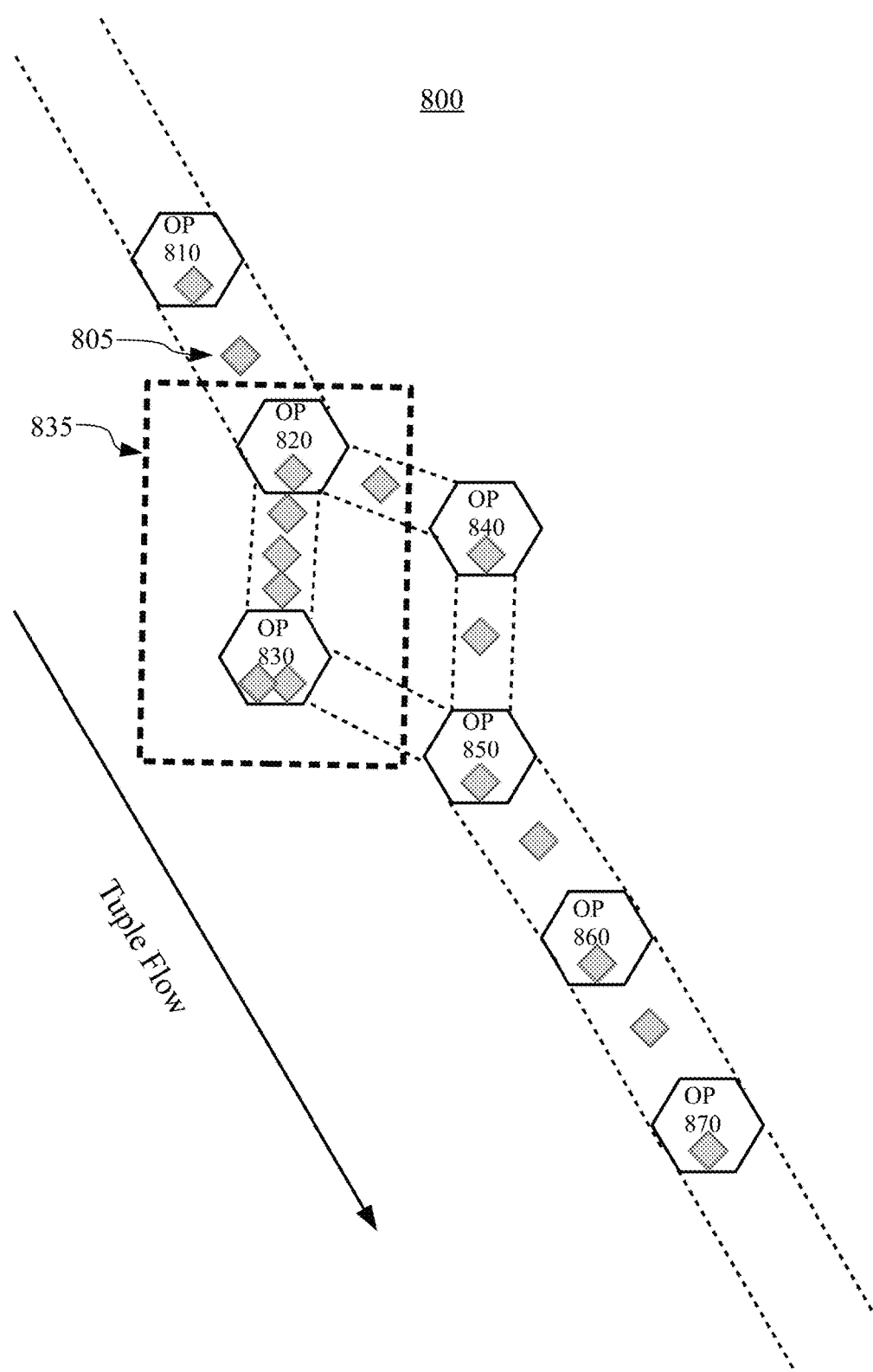
FIG. 8 illustrates an example stream computing environment with respect to managing a set of tuples in a consistent region, according to embodiments.

FIG. 8 illustrates an example stream computing environment 800 with respect to managing a set of tuples in a consistent region, according to embodiments. Aspects of the example stream computing environment 800 relate to managing a window size for a stream operator to facilitate processing of a set of tuples in a steam computing environment. The stream computing environment 800 may include one or more tuples 805, a segment of congestion 835, and stream operators 810, 820, 830, 840, 850, 860, and 870. Aspects of the stream computing environment 800 relate to establishing a set of window configurations for one or more stream operators in the stream computing environment in order to positively impact the segment of congestion 835. Aspects of the stream computing environment 800 may be associated with benefits including tuple throughput rate, data processing efficiency, and stream application performance.

The segment of congestion may include an area or region of the stream computing environment 800 that is associated with data traffic slowdown, bottleneck, tuple build-up, or other decrease in tuple throughput rate. For instance, as shown in FIG. 8, a large number of tuples (e.g., exceeding a threshold number) may accumulate in one area of the operator graph, such as between stream operator 820 and stream operator 830. As described herein, in embodiments, a streams management engine may monitor for indications of congestion, and detect the tuple build-up between stream operators 820 and 830. In embodiments, the streams management engine may analyze the window configuration of stream operators 820 and 830, and ascertain that stream operator 830 has a substantially large window size of "Most recent 10 gigabytes of tuples," such that tuples are not being processed quickly enough and are instead building up in the back-pressure queue of stream operator 830. Accordingly, the streams management engine may be configured to determine and establish a reduced window size for the stream operator 830. As an example, the window size of the stream operator 830 may be reduced from 10 gigabytes to 9 gigabytes, and the streams management engine may monitor the tuple throughput rate and back-pressure queue of the stream operator 830 to determine whether the congestion in the stream computing environment 800 has been reduced/alleviated. In embodiments, the streams management engine may continue to reduce the window size of the stream operator 830 until the throughput rate of the stream computing environment 800 achieves a target throughput threshold (e.g., 800 tuples per second). Other methods of managing the window size of a stream operator to positively impact data throughput in a stream computing environment are also possible.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for window management in a stream computing environment, the method comprising:

monitoring, by a streams management engine, for an indication of congestion, wherein the indication of congestion indicates a build-up of tuples, wherein the indication of congestion indicates a segment of congestion of an operator graph with respect to the stream computing environment, wherein the indication of congestion corresponds with a throughput value for at least a portion of the stream computing environment being less than a benchmark threshold value, wherein the benchmark threshold value comprises 500 tuples per second;

detecting, with respect to the stream computing environment, the indication of congestion, wherein the indication of congestion corresponds with a set of stream operators having a set of windows, wherein the indication of congestion indicates a segment of congestion having a first window which is within the segment of congestion and a second window which is external to the segment of congestion, wherein the detecting occurs in an automated fashion without user intervention;

sensing a parameter value which indicates a window size is adjustable, wherein a parameter value comprising zero indicates the window size is non-adjustable, wherein a parameter value comprising one indicates the window size is adjustable;

determining, based on the indication of congestion, a set of window configurations of the set of windows in the stream computing environment, wherein the set of window configurations includes a set of window sizes of a set of windows, wherein the determining occurs in an automated fashion without user intervention;

establishing, in response to determining the set of window configurations in the stream computing environment, the set of window configurations in the stream computing environment, wherein establishing the set of window configurations in the stream computing environment alters a throughput value of at least a portion of the stream computing environment, wherein the establishing occurs in an automated fashion without user intervention, the establishing further comprising:

decreasing a window size of the first window within the segment of congestion in 10 minute increments until the first window within the segment of congestion comprises a first throughput value of at least 700 tuples per second; and increasing a window size of the second window which is external to the segment of congestion from four gigabytes to six gigabytes;

detecting a reduction of the indication of congestion in response to establishing the set of window configurations;

metering use of the window management by measuring a number of times window management operations are utilized and an amount of data managed using window management operations; and generating an invoice based on the metered use.

* * * * *